Figures 3, 4, 5:
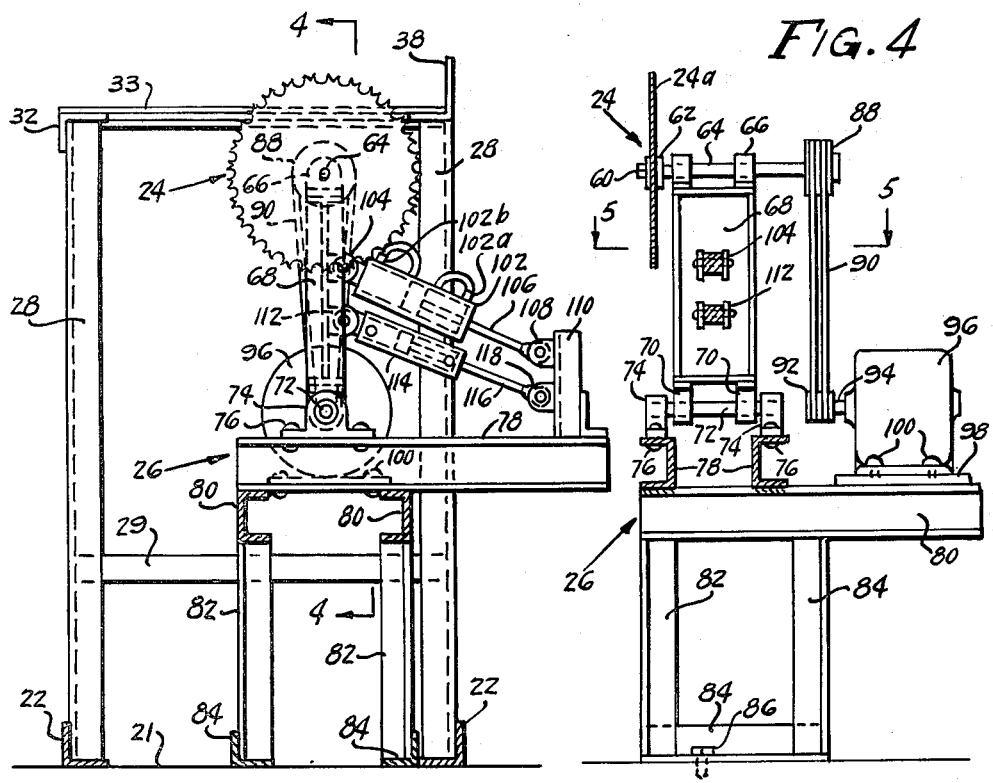

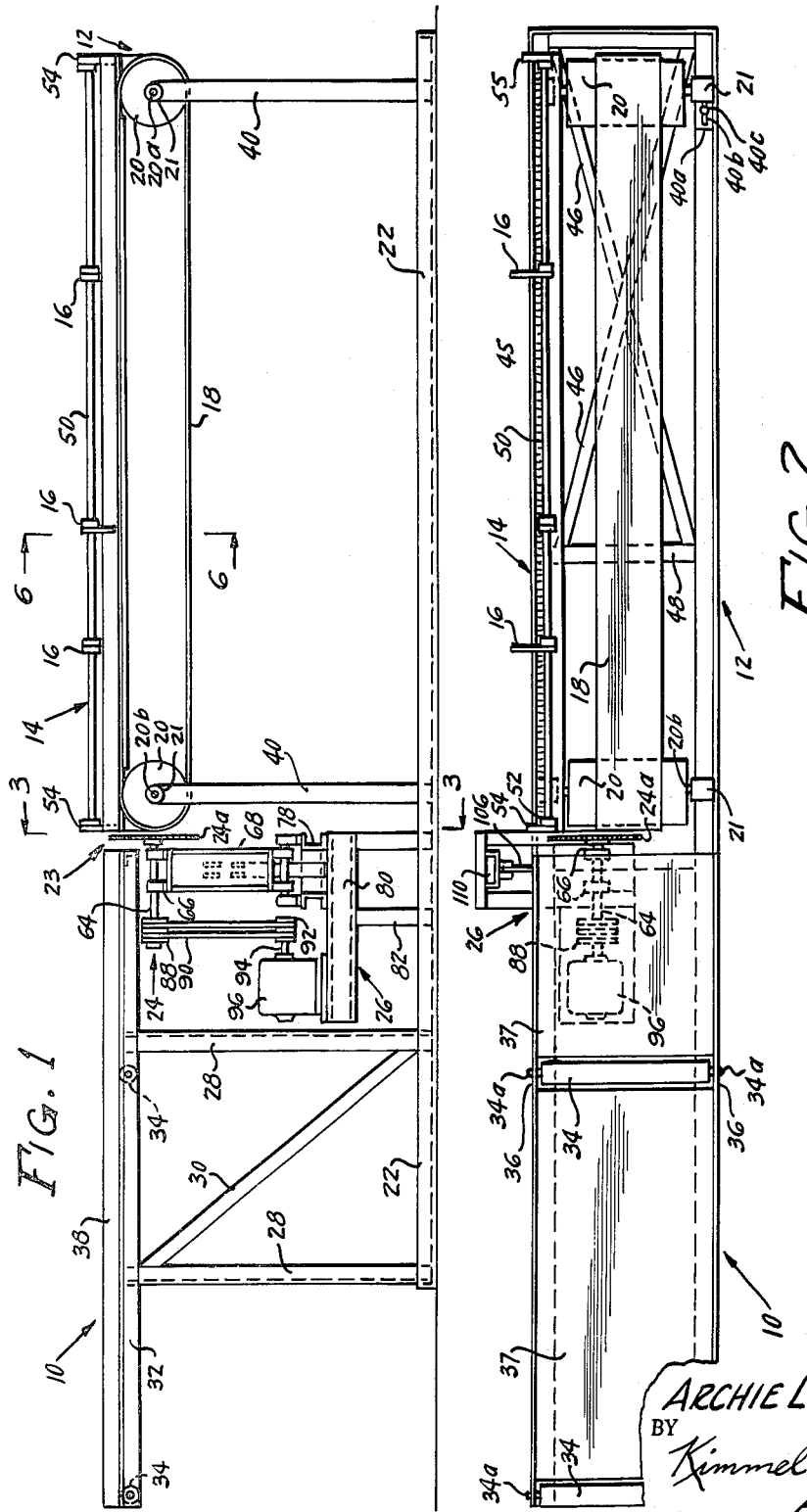

INVENTOR.
ARCHIE L. ALBERS
BY
Kimmel & Crowell
ATTORNEYS.

United States Patent Office 3,229,733
Patented Jan. 18, 1966

3,229,733
LUMBER MEASURING CONVEYOR TABLE AND RADIALLY ACTUATED CUT-OFF SAW COMBINATION
Archie L. Albers, Yuba City, Calif.
(6456 Larry Way, North Highlands, Calif.)
Filed Feb. 3, 1964, Ser. No. 342,140
9 Claims. (Cl. 143—46)

This invention relates to a new and improved lumber conveyor table and cut-off saw combination, and more particularly, to a combined lumber rest table means and measuring conveyor table means cooperating in spaced relationship about a radially actuated cut-off saw supported beneath said table means which permits full viewing of all saw cuts of lumber. Reference is made to my copending application entitled, Lumber Rest Table and Measuring Conveyor Table Combination for a Cut-Off Saw, Serial No. 342,141, filed on an even date herewith.

In the past, saw cut-off attachments usually were suspended at a level below the main portion of the cut-off saw, making operation thereof very hazardous to an operator's hands and prohibited a clear view of the parting saw cut of lumber lengths for each cross-cut operation of the saw.

The instant invention solves the above problems by providing a cut-off saw means below the combined saw table and further provides automatic lumber conveying means saving labor and permitting more efficient operation thereof in accordance with proper safety standards with regard to an operator's hands, during placing, measuring and sawing lumber thereon into designated lengths and conveying sawed lumber therefrom.

A primary object of this invention is to provide a new lumber measuring conveyor table and radially actuated cut-off saw combination for measuring, sawing and conveying lumber therefrom.

A further object of this invention is to provide a new lumber measuring conveyor table and radially actuated cut-off saw combination for measuring, sawing and conveying lumber which is simple of construction, has a minimum number of parts and is easy to manufacture.

Another object of this invention is to provide a safe conveying table and lumber measuring stop means cooperating with a radially actuated cut-off saw means beneath said table.

Another object of this invention is to provide a measuring table having a fast cut-off saw combination.

Yet another object of the invention is to provide a positive safety table means and cut-off saw combination for cutting selected lengths of lumber thereon.

A further object of the invention is to provide a positive measuring stop which, in cooperation with a cut-off saw and conveyor belt, which holds lengths of lumber stationary while being sawed, and after sawing permits the sawed lengths of lumber to be removed by the conveyor belt without further manipulation.

Still another object of the invention is to provide a rest and conveyor table means and radially actuated saw combination wherein the saw and support means therefor may be quickly serviced or interchanged with other similar saw and support means.

Figure 6:
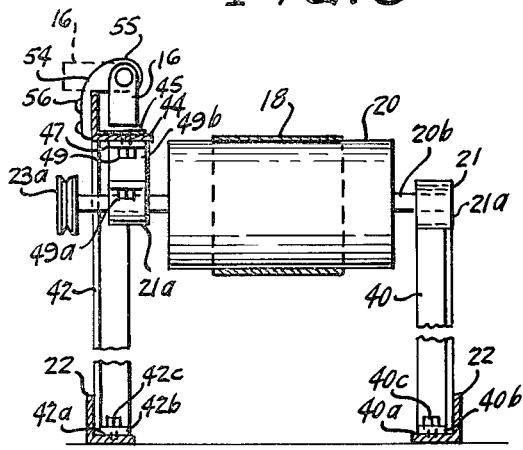

Other objects and many attendant advantages of the instant invention will be readily appreciated as the same becomes better understood by reference to the following detailed description when considered in connection with the accompanying drawings, in which:

FIGURE 1 is a view in elevation of the conveyor table, measuring guide means, rest table means and stop means cooperating with a radially actuated cut-off saw means supported below the table combination, as shown;

FIGURE 2 is a plan view of FIGURE 1;
FIGURE 3 is a transverse cross-sectional view, taken substantially on lines 3—3 of FIG. 1 in the direction of the arrows;
FIGURE 4 is a cross-sectional view of the radial cut-off saw means of FIGURE 3, taken on lines 4—4, in the direction of the arrows;
FIGURE 5 is a cross-sectional view of the radial cut-off saw means of FIGURE 4, taken on lines 5—5 in the direction of the arrows; and
FIGURE 6 is a fragmentary cross-sectional view of the conveyor table, taken on lines 6—6 of FIGURE 1 in the direction of the arrows.

Referring more specifically to the drawings, in which like reference numerals designated like parts throughout the drawings, FIGURES 1, 2, 3, 4, 5 and 6 show a preferred embodiment of the invention which, in general, is comprised of a work material rest table portion 10, a conveyor table portion 12, measuring guide means 14, stop means 16, conveyor belt means 18, roller means 20, support frame means 22 and cut-off saw means 24 with supporting stand 26.

Rest table means 10 is comprised of upright support members 28, lateral structural members 29, and diagonal structural members 30, all bolted, welded or suitably attached together and fixedly supported by a portion of base frame means 22. Upright support structural members 28, front and back side angle members 32, back angle member 38 and two deck plate members 33 are welded or bolted together with roller means 34 mounted on shaft means 34a carried in bearing means 36 in angle members 32.

Conveyor table portion 12 is comprised of upstanding front and back structural support members 40 and 42, respectively; back angle means 44 rigidly joining together back support members 42 by being fixedly secured together by welding, bolts or other conventional means. Support frame means 22 below conveyor table portion 12 is laterally secured together by transverse members 46 and lateral members 48 welded together or fixedly secured together by bolts or other conventional means. Roller means 20 are supportably carried by shaft means 20a and 20b in bearing means 21 of structural members 40 and bearing means 21a secured by bolt means 49a to bracket support means 49 which is in turn adjustably secured by bolt means 49b and slot means 47 in bracket means 49 to back angle means 44. Structural support members 40 and 42 at the distal end of conveyor table means 12 terminate at their lower ends in foot means 40a and 42a, respectively, each having adjustable slot means 40b and 42b therein, as best shown in FIGURE 6, and adjustably secured to frame means 22 by set screw means 40c and 42c, respectively. Roller means 20 carry conveyor belt means 18. Shaft means 20b terminates in an extended overhang portion adapted to fixedly receive pulley means 23a secured thereto by set screw, key means or other conventional means, not shown. Pulley means 23a may be energized by a motor means, as understood by those skilled in the art.

Measuring guide means 14 is comprised of a lateral rod means 50 secured in bearing means 52 in bracket bearing support means 54 carried by angle means 44 and secured by rivet or bolt means 56. Measuring rod means 50 rotatably carries a plurality of stop members 16 thereon in a spaced longitudinal relationship. Angle means 44 may have a conventional measuring scale indicia means 45 inscribed thereon or suitably attached by screw, or other conventional means thereto, as desired.

Stop means 16 when not being used are rotated out of lumber abutting position, except the selected abutting stop means 16 used with a selected length of lumber to be sawed. The unused position of stop means 16 is shown in broken lines in FIGURE 6. Stop means 16 is secured by set screw or any suitable detent means connected to slidable and rotatable bearing means on rod means 50. One of the novel features of this invention resides in the dual function of stop means 16, which serves both as a lumber measuring stop means for a selected length of lumber prior to being cut, and also permits a selected cut of lumber to be removed by conveyor belt means 18 after sawing, without additional manual or other manipulation. For example, a designated length of lumber is measured on angle means 44 and indicia means 45, sawed to a desired length, and, after sawing, is removed by conveyor belt means 18. Since only a very small portion of the edge of the board is held by the stop, and since the conveyor belt 18 is slightly lower than the surface of index 45 (see FIG. 6), the slight friction of the saw blade as it moves back against the end of the severed section, plus the force of gravity is sufficient to disengage this small end portion of the severed piece from the stop and permit the belt to carry the piece away.

Belt means 18 is adjusted by a tightening means comprising one pair back and front support members 40 and 42 being adjustably attached to frame means 22 by slot means 40b and 42b by bolt means 40c and 42c, respectively, cooperating with slot means 47 in bracket means 49, secured by bolt means 49b to longitudinal angle means 44. Bracket means 49 supports bearing means 21a for axle or shaft means 20b of back roller means 20 by bolt means 49a, as best shown in FIGURE 6.

Saw means 24 is comprised of a disc saw means 24a fixedly mounted by nut means 60 and washer means 62 on shaft means 64 in mandrel bearing means 66 of rocker arm means 68 fabricated substantially in cross-section as an I-beam shape and connected by bearing means 70 to shaft means 72 mounted in bearing means 74 secured by bolt means 76 to stand means 26 comprised of dual angle means 78 welded to structural angle means 80 welded to leg means 82 welded or conventionally secured to base means 84 which is secured by lag bolt means 86 to floor 21 or by conventional bracket means to base frame means 22 (not shown), should anchor bolt means 86 be insufficient to prevent non-alignment of saw means 24 during operation with opening 23 between rest table means 10 and conveyor table means 12. Saw shaft means 64 is fixedly attached by conventional screw means (not shown) to pulley means 88. Pulley means 88 is driven by V-belt means 90 and pulley means 92 mounted on shaft means 94 of motor means 96. Motor means 96 is mounted on base means 98 by bolt means 100 and adjustable slot means 100a. Base means 98 is welded or conventionally secured in a suitable manner to angle means 78, in such a manner that the center of longitudinal shaft means 94 of motor means 96 is aligned with the center of longitudinal shaft means 72 to permit proper aligned radial swing of rocker arm means 68 with respect to the driving shaft 94 of motor 96 to insure proper operation and driving of saw means 24 at all times by motor means 96.

The radial operation of rocker arm means 68 is provided by compressed air actuated conventional double-acting cylinder 102 pivotally connected by linkage means including lug and pivotal bearing means 104 to rocker arm means 68 and piston rod means 106 to pivotal bearing means 108 welded to bracket angle means 110 welded or secured in a conventional manner to the distal end of extended angle means 78.

Rocker arm means 68 is secured by linkage means including lug and pivotal bearing means 112 to atmospheric air buffer cylinder means 114 secured by piston rod means 116 to lug and pivotal bearing means 118 welded to bracket means 110 in parallel arrangement with compressed air actuated cylinder 102.

During operation of instant inventive combination, lumber prior to being cut to selected lengths is deposited on rest table means 10 with its distal ends extending along index means 45 and conveyor table means 12 abutting a selected downwardly positioned stop means 16, for a particular length of lumber to be sawed, after which air cylinder 102 connected by connections 102a and 102b to a conventional compressed air supply (not shown) is actuated thereby radially moving rocker arm means 68 in a substantially vertical position depending on the thickness of lumber to be sawed, as best shown in FIGURE 3. The air valve means for controlling air cylinder 102 is conventional and is therefore not shown for clarity.

Buffer or atmospheric air cylinder 114 serves as a position maintaining and dampening or stabilizing force on rocker arm means 68 during the operation of air cylinder means 102 and rocker arm means 68 for a partiuular depth of saw cut of thickness of lumber to be sawed by saw means 24.

Buffer cylinder 114 may be of a type described in detail in my copending application, entitled Double Acting Buffer Air Cylinder, Serial No. 342,136, filed on an even date herewith.

From the foregoing, it will now be seen that there is herein provided a new and improved lumber measuring conveyor table and radially actuated cut-off disc-like saw combination which accomplishes all the objects of this invention, and others, including many advantages of great practical utility and commercial importance.

It is to be understood, of course, that the foregoing disclosure relates to a preferred embodiment of the invention as illustrated, that various modifications and changes may be made in the invention by those skilled in the art without departing from the spirit and scope of the invention as set forth in the appended claims.

I claim:

1. A lumber measuring conveyor table and radially actuated cut-off saw combination comprising a radially actuated quick acting cut-off saw means, a rest table means, conveyor table means cooperating with said rest table means in spaced relationship about said radially actuated cut-off saw means, said conveyor table comprising a lumber measuring and abutting stop and guide means cooperating with designated sawed cut-off lengths of lumber, said saw means comprising an actuating cylinder means for operating said cut-off saw means, said conveyor table means including a conveyor belt means driven by a pulley and conventional motor means, said abutting stop means being located in such spaced relationship with respect to said conveyor belt means that a sawed length of lumber is conveyed from the saw off the distal end of said conveyor table means, said saw means including a double acting air cylinder and linkage means for cooperating with said cut-off saw means, said conveyor table means also including indicia scale measuring means cooperating with said abutting stop means, there being a plurality of selectively spaced stop means cooperating with said indicia scale measuring means, said cut-off saw means further including a buffer air cylinder means coacting in parallel arrangement with said actuating cylinder means for smooth and rapid operation of said saw means.

2. A lumber measuring conveyor table and radially actuated cut-off saw combination comprising a radially actuated cut-off saw means, a rest table means, conveyor table means cooperating with said rest table means in spaced relationship about said cut-off saw means; said rest table means comprising top means, back means and roller support means for cooperating together in moving lumber deposited thereon, said conveyor table means comprising a lumber measuring means, stop means and guide means cooperating with designated sawed cut-off lengths of lumber thereon, said saw means being radially actuated by an actuated cylinder means radially interconnected by linkage means to said saw means, said saw means comprising a double-acting buffer cylinder means coacting in parallel arrangement with said linkage means to smooth the reciprocating travel of said air actuated cylinder and linkage means.

3. A lumber measuring conveyor table and radially actuated cut-off saw combination as in claim 2, wherein said saw means comprises energizing motor means for sawing lumber.

4. A lumber measuring conveyor table and radially actuated cut-off saw combination, as in claim 3, wherein said conveyor table means comprises indicia scale measuring means cooperating with said saw means.

5. A lumber measuring conveyor table and radially actuated cut-off saw combination, as in claim 4, wherein said conveyor table means comprises a plurality of selectively spaced stop means operatively cooperating with said indicia scale measuring means and said saw means during sawing selected lengths of lumber.

6. A lumber measuring conveyor table and radially actuated cut-off saw combination as in claim 5, wherein said saw means is self supporting and so structurally arranged that said saw means may be quickly serviced and interchanged during operation.

7. A radially actuated cut-off saw comprising saw means, radially actuated support means for said saw means, energizing means for said saw means, support means for said saw and energizing means, linkage means operatively connecting said support means with said saw means, energized reciprocating means operatively connected to said linkage means to operate said saw means, said radially actuated support means and said energizing means being in axial alignment for operation thereof, and a buffer reciprocating means connected in parallel operating arrangement with said energized reciprocating means for smooth and unjerky operation of said cut-off saw.

8. A radially operated and energized cut-off saw comprising disc saw means, radially actuated support means for said saw means, motor energizing means for said saw means, support means for said saw and energizing means, multiple linkage means operatively connecting said support means with said saw means, and air actuated reciprocating cylinder means operatively connected to said linkage means to operate said saw means, said radially actuated support means for said saw means and said energizing motor means being in axial alignment for proper operation thereof.

9. A radially operated and energized cut-off saw as in claim 8, comprising a buffer reciprocating air cylinder means connected in parallel operating arrangement with said air actuated reciprocating cylinder means by being pivotally connected between said linkage means and said radially actuated support means for said saw means.

References Cited by the Examiner

UNITED STATES PATENTS

| | | | |
|---|---|---|---|
| 867,081 | 9/1907 | Robinson. | |
| 869,309 | 10/1907 | Kramer | 143—168 |
| 1,759,835 | 5/1930 | Boynton | 143—168 |
| 3,024,818 | 3/1962 | Scoville | 143—46 X |

WILLIAM W. DYER, Jr., *Primary Examiner.*

W. D. BRAY, *Assistant Examiner.*